United States Patent
Lagnado et al.

(10) Patent No.: US 12,314,126 B2
(45) Date of Patent: May 27, 2025

(54) REPAIR COMMANDS FOR ELECTRONIC DEVICES

(71) Applicant: Hewlett-Packard Development Company, L.P., Spring, TX (US)

(72) Inventors: Isaac Lagnado, Spring, TX (US); Steven Harold Petit, Spring, TX (US); Edgar Roberto Mejia, Spring, TX (US); Jaime Rafael Canales, Spring, TX (US); Sandro Secci, Grenoble (FR); Rudolf Ludwig Antonius Wegener, Grenoble (FR); Patrick Jacques Andre Marie Daney deMarcillac, Grenoble (FR)

(73) Assignee: Hewlett-Packard Development Company, L.P., Spring, TX (US)

(*) Notice: Subject to any disclaimer, the term of this patent is extended or adjusted under 35 U.S.C. 154(b) by 19 days.

(21) Appl. No.: 18/005,814

(22) PCT Filed: Aug. 18, 2020

(86) PCT No.: PCT/US2020/046830
§ 371 (c)(1),
(2) Date: Jan. 17, 2023

(87) PCT Pub. No.: WO2022/039725
PCT Pub. Date: Feb. 24, 2022

(65) Prior Publication Data
US 2023/0281074 A1 Sep. 7, 2023

(51) Int. Cl.
*G06F 11/07* (2006.01)

(52) U.S. Cl.
CPC ...... *G06F 11/0793* (2013.01); *G06F 11/0748* (2013.01)

(58) Field of Classification Search
CPC .......... G06F 11/0793; G06F 11/0748
See application file for complete search history.

(56) References Cited

U.S. PATENT DOCUMENTS 6,757,837 B1  6/2004  Platt et al.
7,454,606 B2  11/2008  Marquiz
(Continued)

FOREIGN PATENT DOCUMENTS

AU   2010364976 A1 *  5/2013  ............ G06F 11/00
EP      3173929 A1 *  5/2017  ............ G01R 31/00
(Continued)

*Primary Examiner* — Matthew M Kim
*Assistant Examiner* — Indranil Chowdhury
(74) *Attorney, Agent, or Firm* — Knobbe, Martens, Olson & Bear, LLP

(57) ABSTRACT

An electronic device that comprises a component, communication port, and a controller coupled to the component and the communication port. The controller is to store operational data of the component during operation of the electronic device. The controller is to provide the operational data to a peripheral device coupled to the electronic device in response to the electronic device establishing a wired connection to the peripheral device via the communication port, the operational data secured by a security credential of the controller. The controller is to receive a repair command from the peripheral device based on the operational data. The controller is to correct a malfunction of the component based on the repair command.

13 Claims, 7 Drawing Sheets

(56) References Cited

U.S. PATENT DOCUMENTS

| | | | |
|---|---|---|---|
| 8,234,238 B2 | 7/2012 | Keith, Jr. | |
| 9,313,602 B2 | 4/2016 | Sandler et al. | |
| 9,529,602 B1* | 12/2016 | Swierk | G06F 9/45558 |
| 10,779,432 B1* | 9/2020 | Duncan | H04L 9/0891 |
| 2002/0188887 A1* | 12/2002 | Largman | G06F 11/1417 |
| | | | 714/13 |
| 2006/0168475 A1* | 7/2006 | Segers | G06F 11/0748 |
| | | | 714/25 |
| 2008/0048837 A1 | 2/2008 | Montgomery et al. | |
| 2010/0251002 A1* | 9/2010 | Sivasubramanian | ......... |
| | | | G06F 11/0793 |
| | | | 714/2 |
| 2011/0161721 A1* | 6/2011 | Fulginiti | G06Q 10/10 |
| | | | 714/E11.029 |
| 2014/0059107 A1* | 2/2014 | Yang | H04W 12/06 |
| | | | 709/201 |
| 2015/0160990 A1 | 6/2015 | Massoud | |
| 2016/0335151 A1* | 11/2016 | Swierk | G06F 21/50 |
| 2016/0342477 A1* | 11/2016 | Swierk | G06F 9/4406 |
| 2016/0350132 A1* | 12/2016 | Seibert | G06F 11/2294 |
| 2016/0350166 A1* | 12/2016 | Andrews | G06F 11/22 |
| 2016/0364250 A1* | 12/2016 | Seibert | G06F 9/453 |
| 2016/0371163 A1* | 12/2016 | Swierk | G06F 11/2284 |
| 2016/0378602 A1* | 12/2016 | Herzi | G06F 11/1417 |
| | | | 714/2 |
| 2018/0203755 A1* | 7/2018 | Das | G06F 11/0709 |
| 2019/0042351 A1* | 2/2019 | Connor | G06F 9/4405 |
| 2020/0319899 A1* | 10/2020 | Wille | G06F 9/4401 |
| 2021/0334765 A1* | 10/2021 | Nottingham | G06F 21/34 |
| 2022/0342739 A1* | 10/2022 | Zhang | G06F 11/0724 |
| 2023/0161662 A1* | 5/2023 | Wollny | G06F 11/3476 |
| | | | 714/48 |
| 2024/0152442 A1* | 5/2024 | Sethi | G06F 11/349 |

FOREIGN PATENT DOCUMENTS

| | | |
|---|---|---|
| EP | 3859526 A1 | 8/2021 |
| FR | 2790320 A1 | 9/2000 |
| WO | WO-2022135215 A1 * | 6/2022 |

* cited by examiner

REPAIR COMMANDS FOR ELECTRONIC DEVICES

BACKGROUND

A significant percentage of the global population uses electronic devices every day, including notebook computers, printers, scanners, copiers, tablets, smartphones, video game consoles, and so on. Many such electronic devices contain hardware components, such as processors, displays, and memory. These electronic devices also contain executable code, such as applications, basic input output system (BIOS) code, and various types of firmware.

BRIEF DESCRIPTION OF THE DRAWINGS

Various examples will be described below referring to the following figures.

DETAILED DESCRIPTION

Electronic devices frequently malfunction, for example, due to difficulties with hardware components or executable code stored in the electronic devices. Repairing a malfunctioning electronic device can be challenging, causing significant frustration, expense, and loss of productivity for the user of the electronic device. A user may contact a remotely-located service technician (e.g., an employee of the electronic device manufacturer) to obtain assistance in resolving the malfunction, but these efforts are often unsuccessful due to the service technician's inability to diagnose the malfunction remotely, the user's inability to implement the service technician's troubleshooting suggestions, and other logistical challenges. In such cases, the user may ship the malfunctioning electronic device to the service technician for repair, adding to the user's frustration, expense, and loss of productivity.

This disclosure describes a peripheral device that resolves the challenges described above. The peripheral device may be coupled to a malfunctioning electronic device, such as a notebook computer, via a port (e.g., a Universal Serial Bus (USB) port) in the malfunctioning electronic device. The peripheral device is to communicate with an embedded controller (EC) within the electronic device to obtain operational data related to the condition of the electronic device, for example, operational data related to a malfunction that the electronic device may be experiencing. The peripheral device is to obtain such operational data and communicate the operational data to a local user or service technician device, such as a smartphone, or to a remote service technician (e.g., the manufacturer of the electronic device). The user or service technician may use the operational data to diagnose the nature of the malfunction and may issue a repair command to the electronic device via the peripheral device. For example, if the BIOS code on the electronic device is defective, a manufacturer server may automatically diagnose the defective BIOS code and may automatically issue a repair command to the electronic device via the peripheral device. In this way, users, service technicians, and their devices are able to gather useful diagnostic information both locally and remotely and to correct malfunctions without user involvement and without regard to geographic location. Examples of systems and methods relating to such peripheral devices are now described with reference to FIGS. 1-7.

Figure 1:
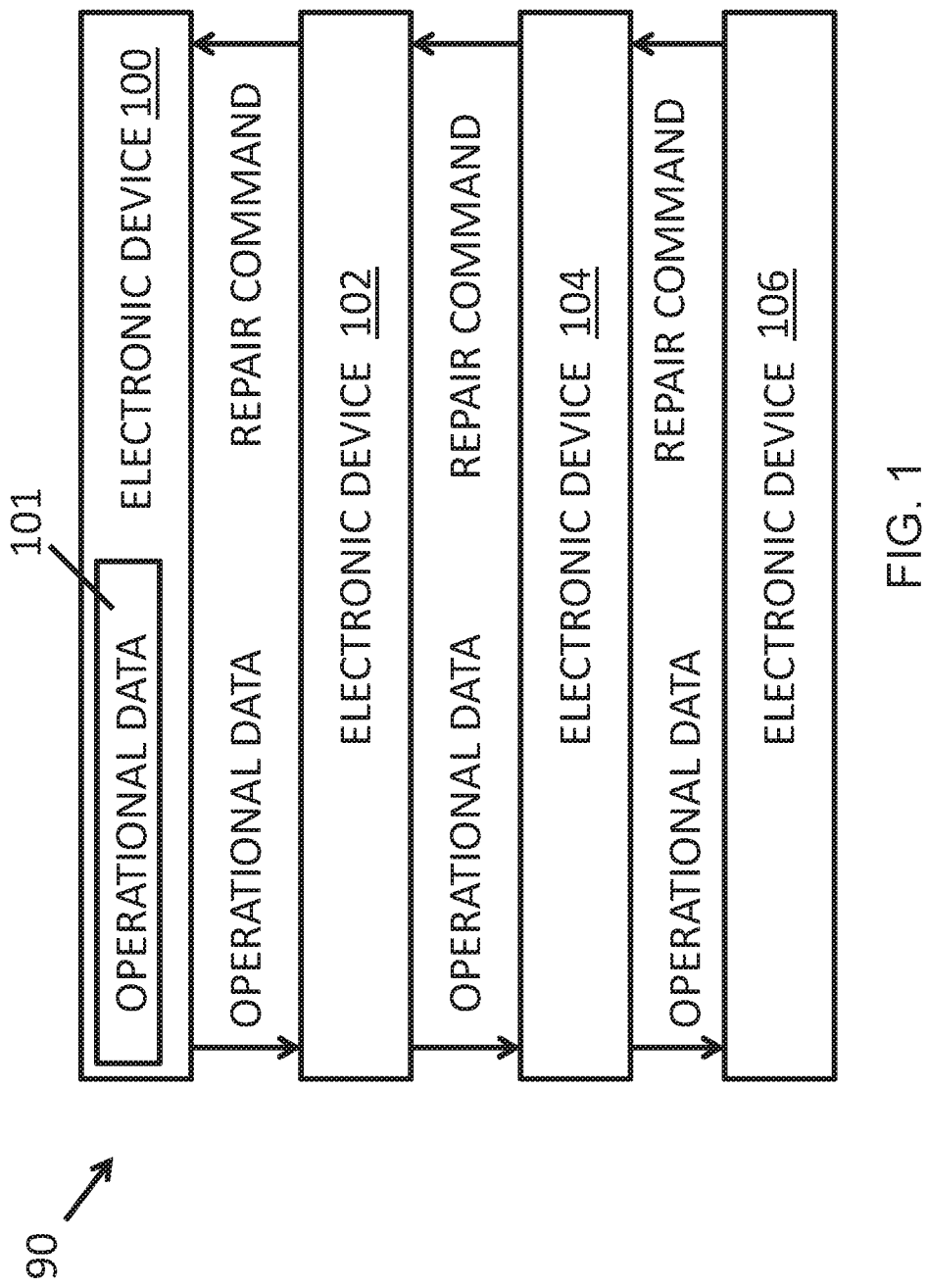
FIG. 1 is a schematic block diagram of a system including a malfunctioning electronic device, a peripheral device to obtain and provide repair commands to the malfunctioning electronic device, and multiple electronic devices to obtain and provide repair commands to the peripheral device, in accordance with various examples.

FIG. 1 is a schematic block diagram of a system 90. The system 90 may include multiple electronic devices, including an electronic device 100, an electronic device 102, an electronic device 104, and an electronic device 106. The electronic device 100 may communicate with the electronic device 102 via a wired connection or a wireless connection. The electronic device 102 may communicate with the electronic device 104 via a wired connection or a wireless connection. The electronic device 104 may communicate with the electronic device 106 via a wired connection or a wireless connection. In examples, any of the electronic devices 100, 102, 104, and 106 may communicate with any of the other electronic devices 100, 102, 104, and 106 via a wired or wireless connection. A wired connection may include a Universal Serial Bus (USB) connection, such as a USB connection implementing a USB alternate mode. A wireless connection may include a WiFi connection, a BLUETOOTH® connection, or any other suitable wireless connection. Other types of wired and wireless connections are contemplated and included in the scope of this disclosure.

In some examples, the electronic device 100 may be a notebook computer, a tablet, a smartphone, a wireless headset, a display, a speaker, a desktop computer, or any other suitable electronic device subject to malfunction. In some examples, the electronic device 102 may be a peripheral device such as a dongle, a thumb drive, or any other type of electronic device able to perform the functions attributed herein to the electronic device 102. In some examples, the electronic device 104 may be a smartphone, a notebook computer, a tablet, a desktop computer, or any other electronic device capable of wireless communications, for instance, cellular network (e.g., 4G, 5G) communications. In some examples, the electronic device 104 may comprise any suitable electronic device capable of performing the functions attributed herein to the electronic device 104, such as a server, a desktop computer, or a notebook computer. For purposes of this description, the electronic device 100 is assumed to be a notebook computer, the electronic device 102 is assumed to be a dongle, the electronic device 104 is assumed to be a smartphone, and the electronic device 106 is assumed to be a server or workstation computer.

During normal operation, the electronic device 100 may monitor and store operational data 101 relating to the operation of a component within the electronic device 100. Such a component may include, for example, a central processing unit (CPU), a graphics processor, a sound card, a memory, a semiconductor package containing an integrated circuit capable of performing an action, executable code, and so on. In some examples, the component may be designed or programmed to provide such operational data 101 for storage, and in other examples, a different component, such as a controller (e.g., an embedded controller (EC)), may be designed or programmed to interrogate the component for such operational data 101. The operational data 101 may be stored in the controller, in a memory device within the electronic device 100, or in any other suitable location.

The electronic device 100 may store the operational data 101 on a regular basis or an irregular basis. The electronic device 100 may store the operational data 101 for any suitable length of time and may periodically delete outdated operational data 101 that have been stored for a threshold length of time. The electronic device 100 may store operational data for one component within the electronic device 100 or for multiple components within the electronic device 100, although the remainder of this disclosure assumes that the electronic device 100 monitors and stores operational data for one component for ease of explanation. The electronic device 100 may store such operational data 101 during normal operation so that if and when the electronic device 100 (and, specifically, the component for which operational data are being monitored and stored) begins to malfunction, information pertaining to the operation of the electronic device 100 (and, specifically, the component) will already have been stored and may be available for use in diagnosing and repairing the malfunction. In some examples, the electronic device 100 may continue to monitor and store operational data after a malfunction.

Upon a malfunction of the electronic device 100 (e.g., malfunction of the component within the electronic device 100), a user may connect the electronic device 102 to the electronic device 100. As explained above, this connection may be a USB connection that uses, e.g., a USB alternate mode protocol to facilitate communication between the electronic devices 100, 102. Other types of connections are contemplated and included in the scope of this disclosure. It is assumed that the aforementioned controller (e.g., EC) within the electronic device 100 remains operational despite the malfunction of the electronic device 100, and even if the component malfunctions or multiple components malfunction. Accordingly, the controller may recognize that a connection has been established with the electronic device 100. In response to this recognition, the electronic device 100 may interrogate the electronic device 102 to determine whether the electronic device 102 is to diagnose and repair the malfunction. For example, the controller within the electronic device 100 may be programmed to perform a handshake protocol with the electronic device 102, to perform a security credential verification with the electronic device 102, or to perform any other suitable initialization process to verify that the electronic device 102 is to diagnose and repair the malfunction. In this regard, the electronic device 102 may be programmed to provide the electronic device 100 with any information, security credentials, etc. requested to complete the initialization process. In some examples, upon the connection being established between the electronic devices 100, 102, the electronic device 100 initiates the initialization process, and in other examples, the electronic device 102 initiates the initialization process.

After the electronic device 100 verifies that the electronic device 102 is to diagnose and repair the electronic device 100 and that the electronic device 102 is authorized to do so, the electronic device 100 may provide the stored operational data 101 mentioned above to the electronic device 102, for example, via the wired USB connection, and for instance using a USB alternate mode protocol. Upon receipt of the operational data 101 from the electronic device 100, the electronic device 102 may store the operational data, e.g., on a memory in the electronic device 102. In examples, the electronic device 102 may provide the operational data to the electronic device 104, for example, via a wireless connection. In examples, the electronic device 100 is programmed to provide additional information to the electronic device 102 pertaining to the operational data, for example, a model number of the component experiencing the malfunction, a model number of the electronic device 100, a manufacturer of the component or the electronic device 100, specifications associated with the component or the electronic device 100, and so on. In examples, the additional information includes information that may be useful in diagnosing and/or repairing the malfunction of the component in the electronic device 100. In examples, the electronic device 102 is programmed to provide this additional information to the electronic device 104 when providing the operational data to the electronic device 104. In examples, the electronic device 100 may secure (e.g., encrypt) the operational data, additional data, and any other data provided to the electronic device 102 using a security credential(s) accessible to the electronic device 100, and the electronic device 102 may be able to access the security credential(s) or other credential(s) to unlock (e.g., decrypt) the secured operational data, additional data, etc.

Upon receiving the operational data and any other additional information from the electronic device 102, the electronic device 104 may transmit the operational data and additional information to the electronic device 106. In examples, the electronic device 106 is located remotely from the electronic device 104 (and/or from the remaining electronic devices 100, 102), meaning that the electronic device 106 is in a different building, in a different city, in a different state, or in a different country than the electronic device 104 (and/or than the electronic devices 100, 102). In examples, the electronic device 104 may transmit the operational data and additional information to the electronic device 106 via a cellular network (e.g., near field communication, 4G, 5G).

Upon receiving the operational data and additional information, the electronic device 106 may use the operational data and additional information to diagnose the malfunction of the component and to determine a repair strategy for the component. The electronic device 106 may diagnose and prepare a repair strategy in any suitable manner. For example, the electronic device 106 may be programmed to diagnose malfunctions and prepare repair strategies based on the operational data and additional information received using a deterministic process. In examples, the electronic device 106 may be programmed to diagnose malfunctions and prepare repair strategies based on the operational data and additional information using a non-deterministic, artificial intelligence (AI) process. In examples, a user (e.g., service technician) may operate the electronic device 106 and may diagnose and prepare repair strategies for malfunctions based on the operational data and additional information received. Other techniques for diagnosing and preparing repair strategies for malfunctions are contemplated and included in the scope of this disclosure.

The electronic device 106 may then prepare a repair command(s) based on the diagnosis and repair strategy. The electronic device 106 may transmit the repair command(s) to the electronic device 104, which, in turn, may transmit the repair command(s) to the electronic device 102, which, in turn, may transmit the repair command(s) to the electronic device 100, which, in turn, may execute the repair command(s) to repair the component and to resume normal operation. Execution of the repair command may, for instance, cause the malfunctioning component to be adjusted to correct or update the malfunction. For example, if the malfunctioning component is executable code (e.g., basic input output system (BIOS) code, such as BIOS code implementing the Unified Extensible Firmware Interface (UEFI) specification), the controller in the electronic device 106 may execute the repair command, which causes the controller to edit the executable code to correct the malfunction. In other examples, the controller, upon executing the repair command, may adjust a setting in the malfunctioning component or produce an electrical signal that effects a change of some type in the malfunctioning component. In examples, the controller, upon executing the repair command, may produce an electrical signal that affects the malfunctioning component or a component other than the malfunctioning component to compensate for the malfunction instead of correcting the malfunction.

Figure 2:
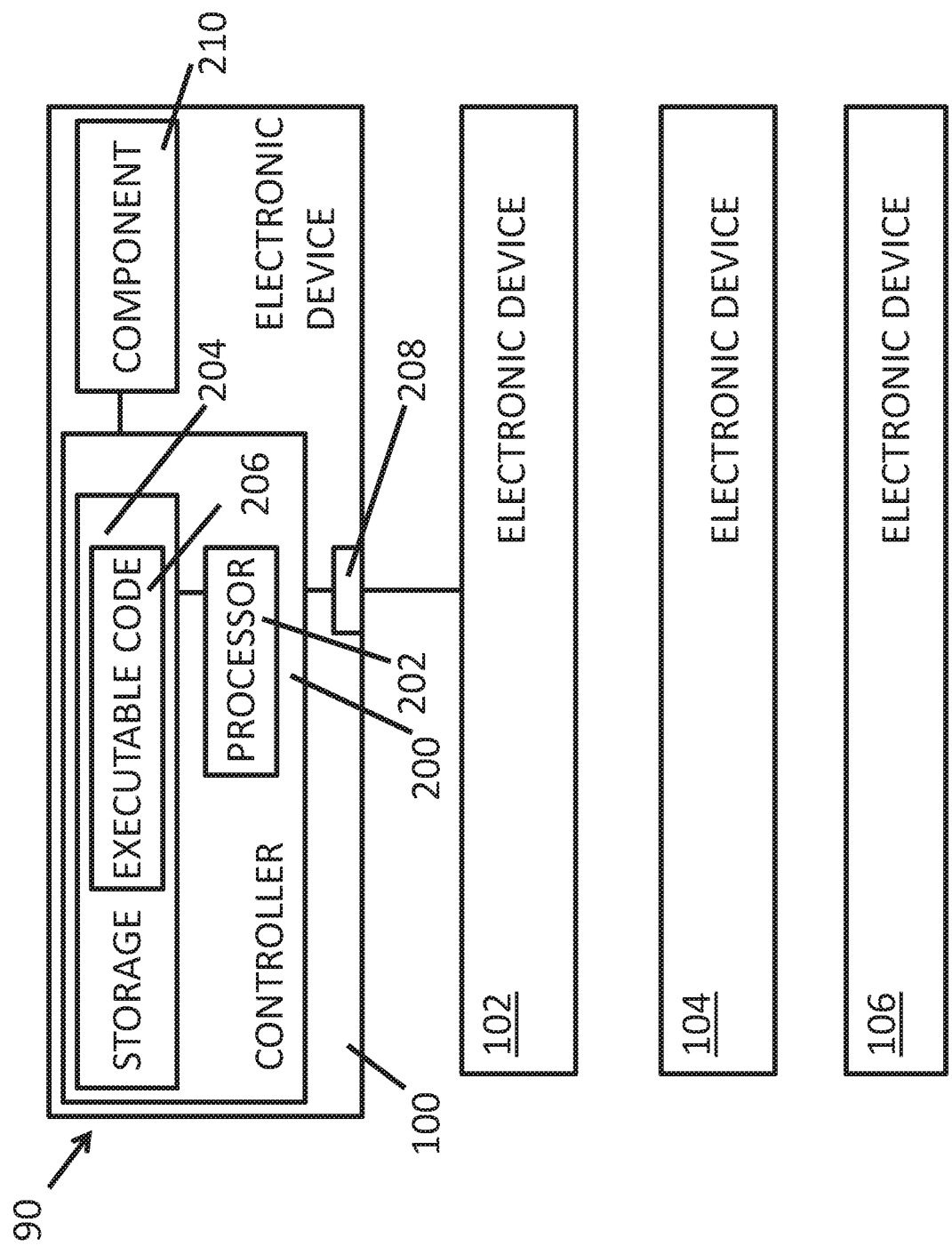
FIG. 2 is a schematic block diagram of a system in which a malfunctioning electronic device receives repair commands from a peripheral device, in accordance with various examples.
Figure 3:
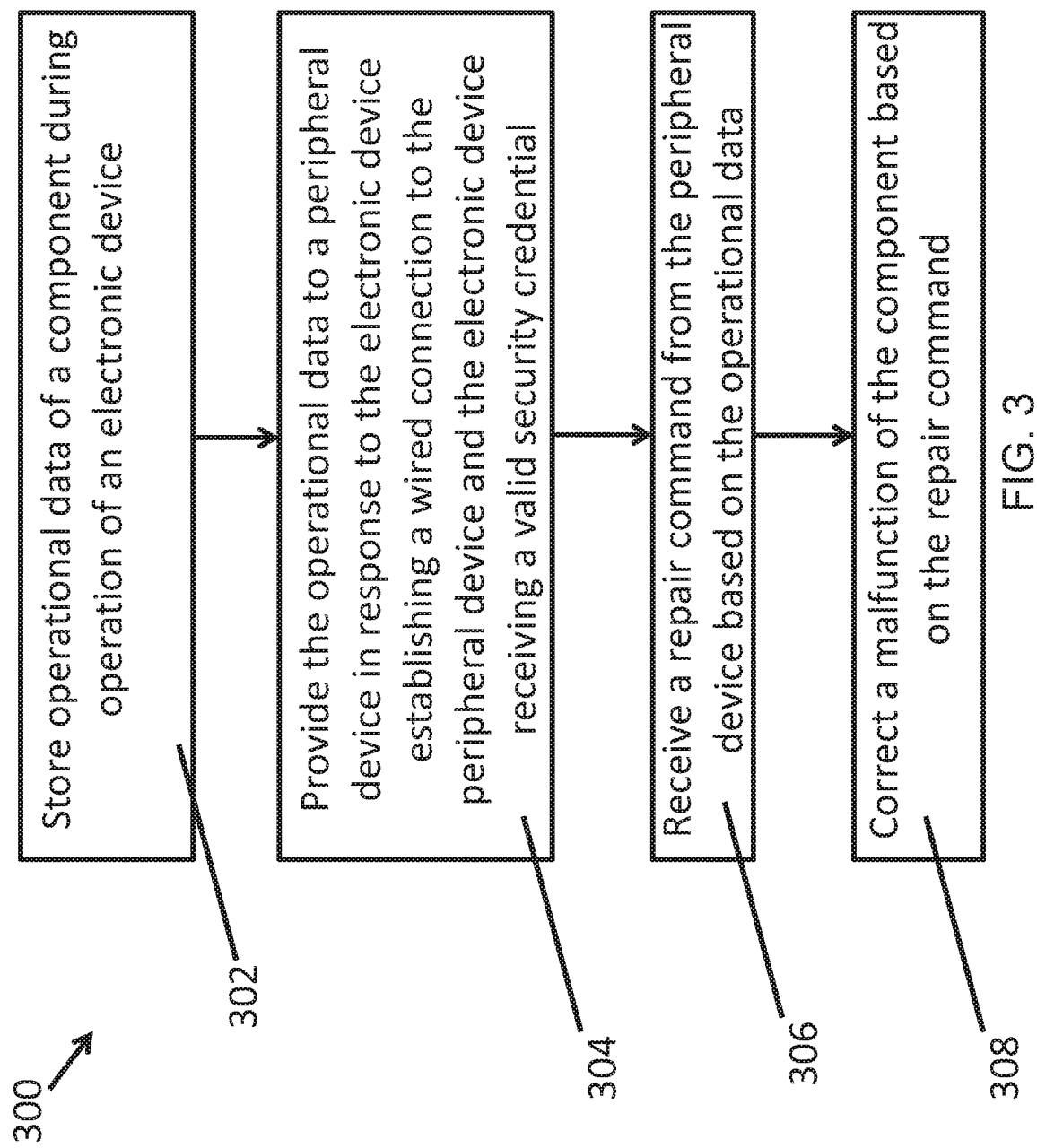
FIG. 3 is a flow diagram of a method by which a malfunctioning electronic device may receive repair commands from a peripheral device, in accordance with various examples.

FIG. 2 is a schematic block diagram of the system 90 showing the electronic device 100 in detail. The electronic device 100 includes a controller 200 (e.g., an EC) comprising a processor 202 and storage 204 (e.g., random access memory (RAM), read only memory (ROM)) coupled to the processor 202. The storage 204 stores executable code 206, for example, firmware or software. The processor 202 executes the executable code 206, which causes the processor 202 to perform some or all of the actions attributed herein to the processor 202, the controller 200 and, more generally, to the electronic device 100. The controller 200 couples to a communication port 208 of the electronic device 100. In some examples, the communication port 208 may be a USB port to facilitate communication with the electronic device 102. In some examples, communications via the communication port 208 may be facilitated by a USB alternate mode protocol. The controller 200 also couples to a component 210 that is susceptible to malfunction. As explained above, such components may include executable code, hardware, or a combination thereof.

The operation of the system 90 as shown in FIG. 2 is as described above with respect to FIG. 1 and thus is not repeated in detail here. The operation of the electronic device 100, however, is briefly described with respect to the method 300 of FIG. 3. During normal operation of the electronic device 100, the controller 200 monitors and stores operational data associated with the component 210 (302). As one example, the component 210 may be BIOS code, in which case the controller 200 may monitor and store BIOS error codes such as thermal events, power supply errors, hard drive failures, etc. As another example, the component 210 may be an operating system (OS) code, in which case the controller 200 may monitor and store blue screen failure codes or memory dump codes. The controller 200 may store the operational data, for example, on storage 204.

After at least some operational data has been stored, the electronic device 100 (e.g., the component 210) may experience a malfunction. In examples, the electronic device 100 may have more than one malfunctioning component. However, in such examples, at least the controller (e.g., controller 200, such as an EC) and the communication port (e.g., communication port 208) may remain operational so as to support the repair operations described herein.

After a malfunction has occurred in the component 210, the method 300 includes the controller 200 providing the operational data to a peripheral device in response to the electronic device establishing a wired connection to the peripheral device and, optionally, the electronic device receiving a valid security credential (304). For example, the controller 200 may obtain the operational data from the storage 204 and may provide the operational data to the electronic device 102 (which, as explained above, is also described as a peripheral device) in response to a wired connection (e.g., USB connection) being established between the electronic devices 100, 102, and further in response to the electronic device 100 receiving a valid security credential from the electronic device 102. For example, the controller 200 may receive a security credential from the electronic device 102 and may compare it to a security credential stored on the storage 204 to verify whether the electronic device 102 is authorized to receive the operational data from the electronic device 100. In examples, a BIOS F10 authorization technique may be used to verify security credentials. In examples, the electronic device 100 may provide the operational data to the electronic device 102 without performing a reboot of the electronic device 100. In examples, the controller 200 secures (e.g., encrypts) the operational data, additional data, etc. prior to providing such data to the electronic device 102, and the electronic device 102 may unlock (e.g., decrypt) this data.

At 306, the controller 200 may receive a repair command from the electronic device 102 based on the operational data that was provided to the electronic device 102. Example manners in which the electronic device 102 may obtain the repair command are described above. In examples, the controller 200 may receive a repair command contingent on the verification or re-verification of security credentials provided by the electronic device 102.

At 308, the controller 200 may correct a malfunction of the component 210 by executing the repair command. Examples of adjustments that may be made to the component 210 include editing executable code (e.g., BIOS or an OS). Other examples of adjustments to the component 210 include reconfiguring BIOS settings to eliminate an error condition or conflict between devices, e.g., configuring a drive to boot using a different boot protocol. In examples, the controller 200 may correct the malfunction without performing a reboot of the electronic device 100. In examples, the controller 200 may execute the repair command contingent upon a verification or a re-verification of security credentials provided by the electronic device 102.

Figure 4:
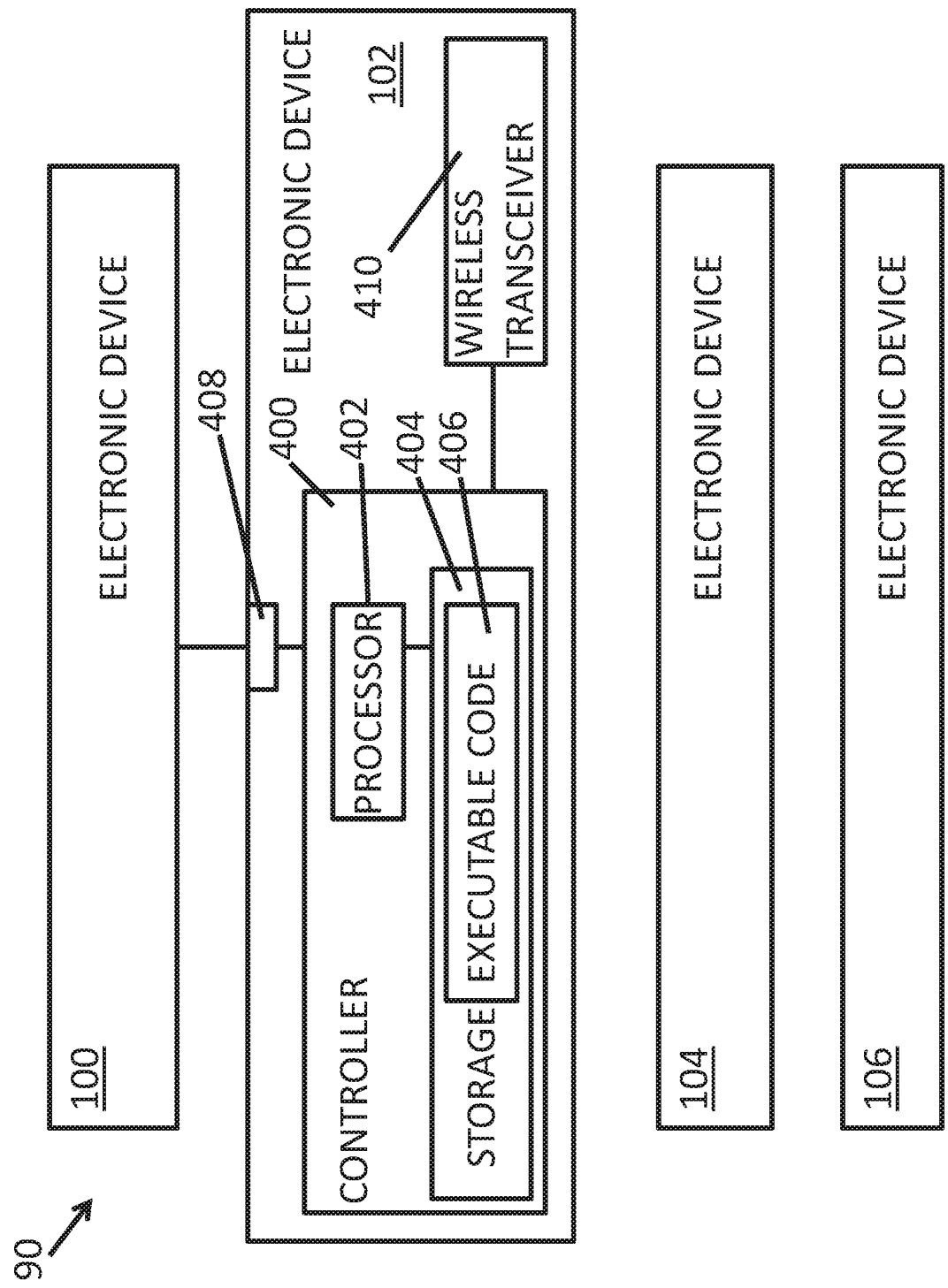
FIG. 4 is a schematic block diagram of a system in which a peripheral device is to obtain and provide repair commands to a malfunctioning electronic device, in accordance with various examples.
Figure 5:
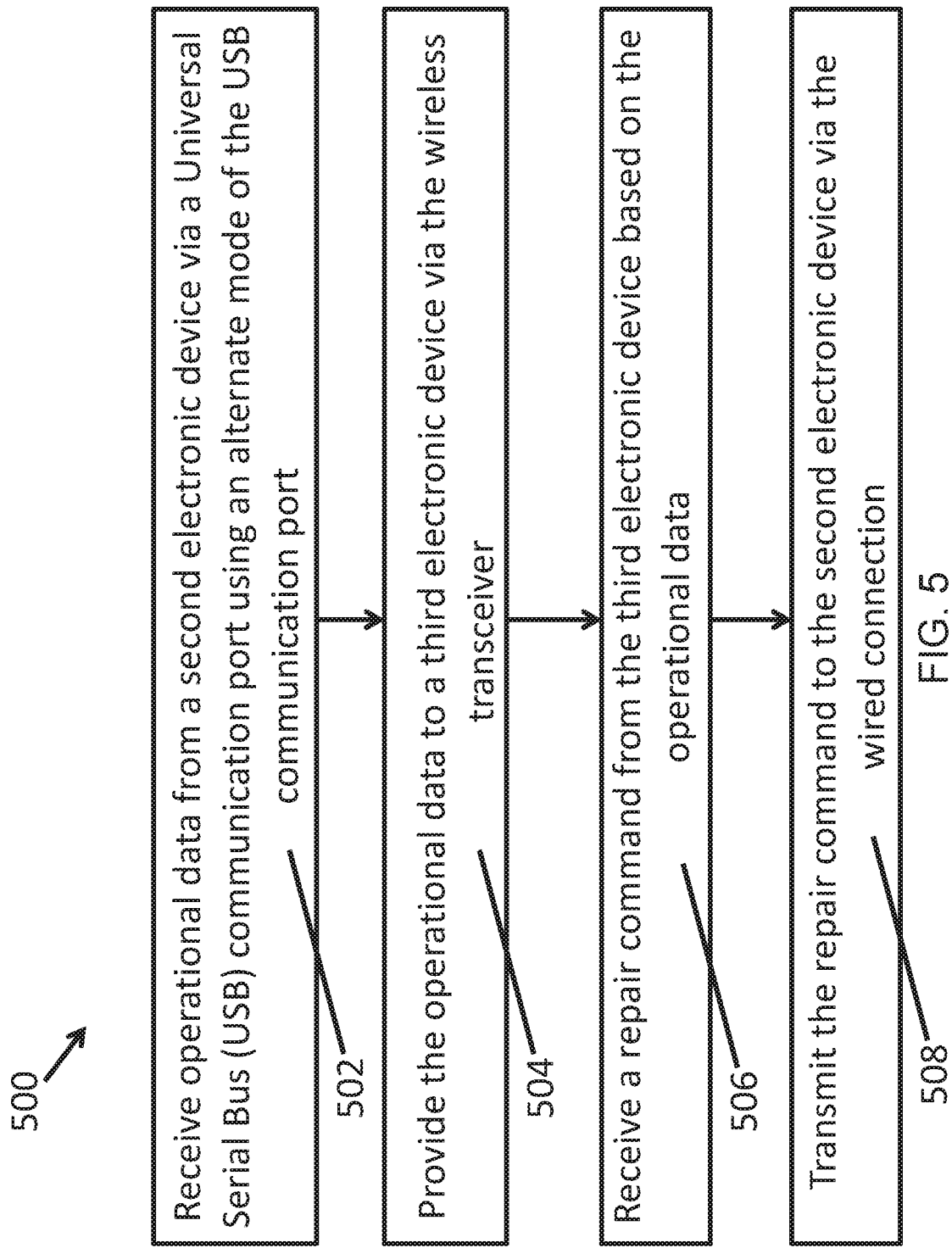
FIG. 5 is a flow diagram of a method by which a peripheral device is to obtain and provide repair commands to a malfunctioning electronic device, in accordance with various examples.

FIG. 4 is a schematic block diagram of the system 90 depicting the electronic device 102 (e.g., peripheral device) in detail. The electronic device 102 includes a controller 400, such as a microcontroller. The controller 400 may include a processor 402 coupled to storage 404 storing executable code 406. By executing the executable code 406, the processor 402 may perform the actions attributed herein to the processor 402, the controller 400, and more generally, to the electronic device 102. The electronic device 102 includes a communication port 408 coupled to the controller 400. The communication port 408 in some examples may be a USB port capable of communicating with the communication port 208 using, e.g., a USB alternate mode. The electronic device 102 also includes a wireless transceiver 410 coupled to the controller 400.

The operation of the system 90 is as described above and thus is not repeated in detail here. However, the operation of the electronic device 102 is briefly described with respect to the method 500 of FIG. 5. At 502, the controller 400 receives the operational data from the electronic device 100 via the communication port 408 using, e.g., a USB alternate mode. The controller 400 receives the operational data, for example, in response to the communication port 408 establishing a wired connection (e.g., USB connection) to the electronic device 100. At 504, the controller 400 provides the operational data to the electronic device 104 via the wireless transceiver 410. At 506, the controller 400 receives a repair command from the electronic device 104 based on the operational data provided to the electronic device 104. Example repair commands may have the properties described above. At 508, the controller 400 transmits the repair command to the electronic device 100 via the communication port 408.

Figure 6:
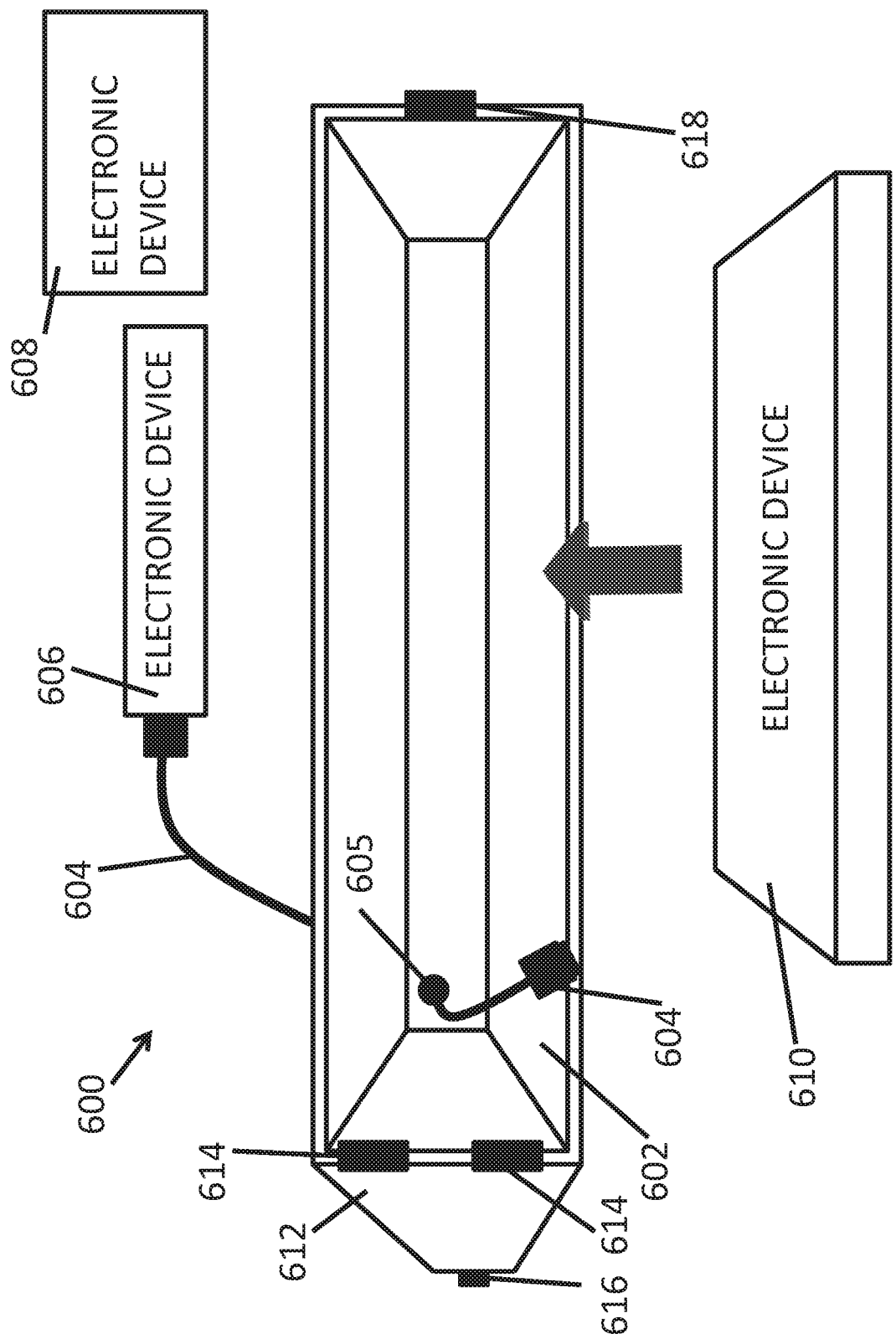
FIG. 6 is a schematic diagram of a system including a securable enclosure to store a malfunctioning electronic device and a peripheral device to obtain and provide repair commands to the malfunctioning electronic device, in accordance with various examples.

FIG. 6 is a schematic diagram of a system 600 including a securable enclosure to store a malfunctioning electronic device and a peripheral device to obtain and provide repair commands to the malfunctioning electronic device, in accordance with various examples. More specifically, the system 600 may include an enclosure 602 and one end of a connector 604 (e.g., a USB connector to perform USB alternate mode communications) positioned inside the enclosure 602. The connector 604 may extend through an orifice 605 in the enclosure 602 and to an area external to the enclosure 602. In this area external to the enclosure 602, the connector 604 may couple to an electronic device 606 (e.g., a peripheral device, such as a dongle). The electronic device 606 is to communicate wirelessly with an electronic device 608, such as a smartphone or a computer (e.g., a workstation). Hinges 614 rotatably couple a cover 612 to the enclosure 602. The cover 612 includes a locking mechanism 616 that securely couples to a locking mechanism 618 when the cover 612 is closed. When the cover 612 is closed and the locking mechanisms 616, 618 are engaged, contents of the enclosure 602 are inaccessible except to those authorized to unlock the locking mechanisms 616, 618. The enclosure 602 may be large enough to store an electronic device 610 (e.g., a malfunctioning notebook computer).

Figure 7:
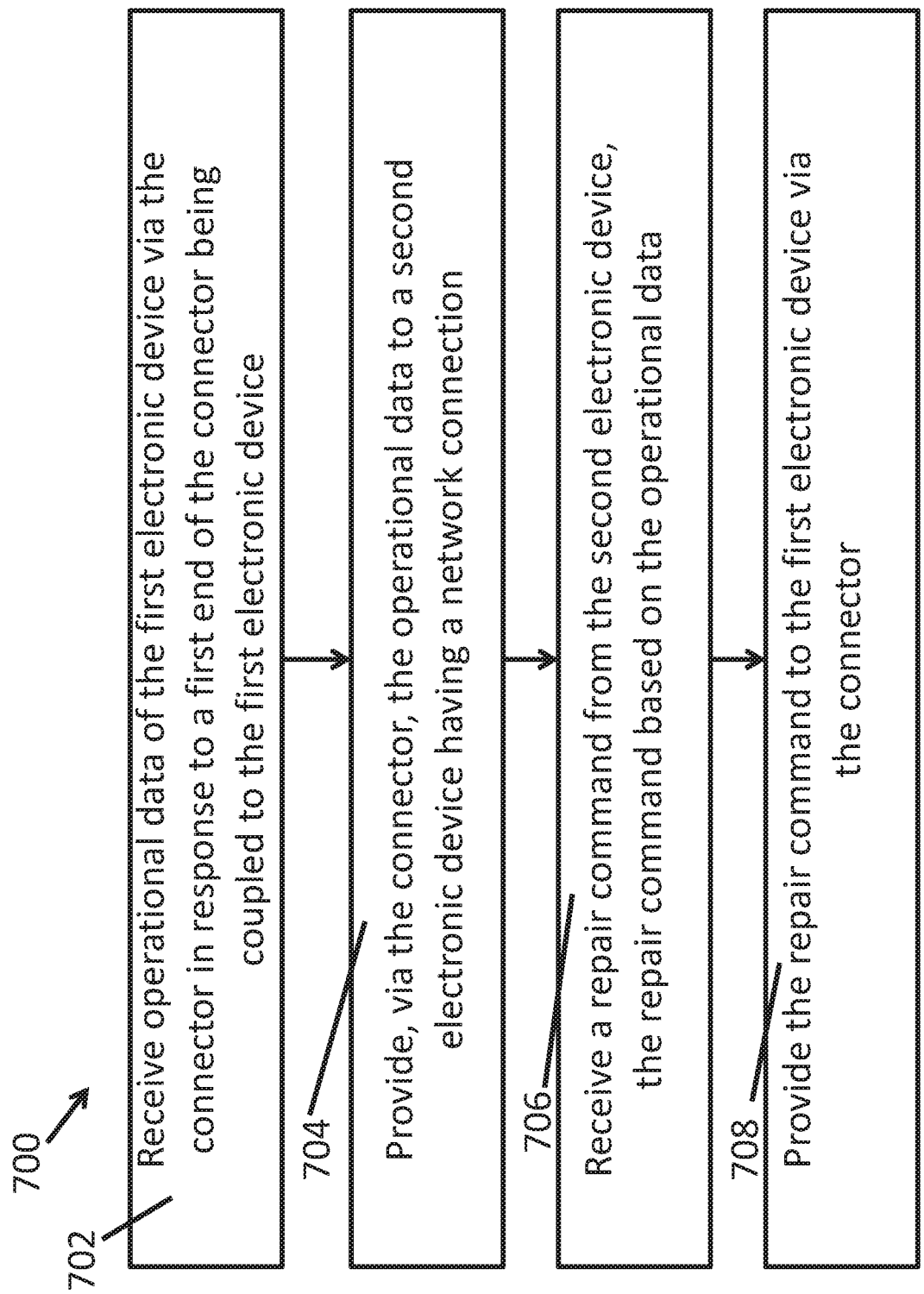
FIG. 7 is a flow diagram of a method by which a peripheral device is to obtain and provide repair commands to a malfunctioning electronic device stored in a securable enclosure, in accordance with various examples.

The operation of the system 600 is now described with respect to the method 700 of FIG. 7. The method 700 may be performed, for example, by the electronic device 606, such as a controller in the electronic device 606. At 702, the electronic device 606 may receive operational data of the malfunctioning electronic device 610 in response to a first end of the connector 604 being coupled to the electronic device 610. In examples, the electronic device 606 may receive the operational data in response to such a connection paired with a handshaking protocol completed between the electronic devices 606, 610, which may include the verification of security credentials as described above. At 704, the electronic device 606 may provide, via the connector 604, the operational data to the electronic device 608. In examples, the electronic device 606 may provide the operational data to the electronic device 608 wirelessly. In examples, the electronic device 608 has access to a network, e.g., the Internet or other public or private network. At 706, the electronic device 606 receives a repair command from the electronic device 608, with the repair command being based on the operational data that was provided to the electronic device 608. The electronic device 608 may obtain the repair command from another electronic device, such as a remotely located device, with which the electronic device 608 may communicate. In examples, the electronic device 608 may generate the repair command automatically, e.g., using a deterministic or non-deterministic executable code. In examples, a user (e.g., support technician) of the electronic device 608 may generate the repair command.

At 708, the electronic device 606 may provide the repair command to the electronic device 610 via the connector 604. The electronic device 610 may then execute the repair command to repair a malfunctioning component within the electronic device 610 in the manner described above.

The foregoing examples assume that a malfunctioning electronic device 100 is powered sufficiently so that the electronic device 100 can perform the operations described above. In some situations, however, the malfunctioning electronic device 100 may lack sufficient power to perform the operations ascribed herein to the electronic device 100. Accordingly, in some examples, the electronic device 102 may provide sufficient power to the electronic device 100 via the wired connection therebetween so that the electronic device 100 may perform the actions ascribed herein to the electronic device 100.

As used herein, a BIOS refers to hardware or hardware and instructions to initialize, control, or operate a computing device prior to execution of an OS of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the UEFI specification or another specification or standard for initializing, controlling, or operating a computing device.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:
    a component;
    a communication port; and
    an embedded controller coupled to the component and the communication port, the embedded controller to:
        store encrypted operational data of the component during operation of the electronic device;
        establish a wired connection to a peripheral device, wherein the peripheral device is coupled to the electronic device to diagnose a malfunction of the component;
        send the encrypted operational data via the communication port using an alternate mode of the communication port and in response to the communication port establishing the wired connection to the peripheral device;
receive a security credential from the peripheral device, wherein the security credential verifies whether the peripheral device is authorized to receive the encrypted operational data from the electronic device;
in response to authenticating the security credential, provide the encrypted operational data to the peripheral device coupled to the electronic device, wherein the peripheral device is to decrypt the encrypted operational data and prepare a repair strategy for the malfunction based on the decrypted operational data;
receive a repair command from the peripheral device based on the repair strategy; and
correct the malfunction of the component based on the repair command.

2. The electronic device of claim 1, wherein the embedded controller is to provide the encrypted operational data to the peripheral device without a reboot of the electronic device.

3. The electronic device of claim 1, wherein the embedded controller is to receive the repair command and to correct the malfunction without a reboot of the electronic device.

4. The electronic device of claim 1, wherein the wired connection is a Universal Serial Bus (USB) connection, and wherein the embedded controller is to provide the encrypted operational data to the peripheral device via the USB connection using a USB alternate mode.

5. The electronic device of claim 1, wherein the embedded controller is to receive power from the peripheral device and, using the received power, provide the encrypted operational data to the peripheral device and correct the malfunction of the component based on the repair command.

6. An electronic device, comprising:
a Universal Serial Bus (USB) communication port to couple to a second electronic device;
a wireless transceiver to wirelessly communicate with a third electronic device; and
a controller coupled to the USB communication port and the wireless transceiver, the controller to:
receive encrypted operational data from an embedded controller of the second electronic device via the USB communication port using an alternate mode of the USB communication port and in response to the USB communication port establishing a wired connection to the second electronic device;
provide a security credential to the embedded controller to receive the encrypted operational data, wherein the security credential verifies whether the electronic device is authorized to receive the encrypted operational data from the second electronic device;
decrypt the encrypted operational data to generate decrypted operational data;
provide the decrypted operational data to the third electronic device via the wireless transceiver, wherein the third electronic device is to:
diagnose a malfunction of a component of the second electronic device based on the decrypted operational data, and
prepare a repair strategy for the malfunction based on the decrypted operational data;
receive a repair command based on the repair strategy from the third electronic device based on the decrypted operational data; and
transmit the repair command to the second electronic device via the wired connection.

7. The electronic device of claim 6, wherein the third electronic device comprises a smartphone.

8. The electronic device of claim 6, wherein the repair command is to cause the second electronic device to alter executable code stored on the second electronic device.

9. A system, comprising:
a component;
an enclosure to store a first electronic device;
a connector having a first end positioned inside the enclosure and a second end positioned external to the enclosure, the first end to couple to the first electronic device; and
a peripheral device comprising a processor that is positioned external to the enclosure and coupled to the second end, the peripheral device to:
receive encrypted operational data of the first electronic device via a USB port of the connector in response to the first end being coupled to the first electronic device;
provide a security credential to the connector to receive the encrypted operational data, wherein the security credential verifies whether the peripheral device is authorized to receive the encrypted operational data from the first electronic device;
decrypt the encrypted operational data to generate decrypted operational data;
provide the decrypted operational data to a second electronic device having a network connection, wherein the second electronic device is to:
diagnose a malfunction of the component based on the decrypted operational data, and
prepare a repair strategy for the malfunction based on the decrypted operational data;
receive a repair command based on the repair strategy from the second electronic device, the repair command based on the decrypted operational data; and
provide the repair command to the first electronic device via the connector.

10. The system of claim 9, wherein the connector is a Universal Serial Bus (USB) connector, and wherein the peripheral device is to receive the encrypted operational data via the USB connector using a USB alternate mode.

11. The system of claim 9, wherein the peripheral device is to receive the encrypted operational data from an embedded controller of the first electronic device.

12. The system of claim 9, wherein the peripheral device is to receive the encrypted operational data in response to the peripheral device providing a valid security credential to the first electronic device.

13. The system of claim 9, wherein the enclosure is a securable enclosure comprising an orifice through which the connector extends.

* * * * *